(12) United States Patent
Hart

(10) Patent No.: US 11,769,122 B1
(45) Date of Patent: Sep. 26, 2023

(54) SYSTEMS AND METHODS FOR CHECK MASKING AND INTERDICTION

(71) Applicant: Wells Fargo Bank, N.A., San Francisco, CA (US)

(72) Inventor: Keith Hart, Tega Cay, SC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 135 days.

(21) Appl. No.: 17/361,584

(22) Filed: Jun. 29, 2021

Related U.S. Application Data

(62) Division of application No. 15/986,341, filed on May 22, 2018, now Pat. No. 11,055,674.

(60) Provisional application No. 62/618,911, filed on Jan. 18, 2018.

(51) Int. Cl.
*G06Q 20/04* (2012.01)
*H04L 9/40* (2022.01)

(52) U.S. Cl.
CPC ......... *G06Q 20/042* (2013.01); *H04L 63/083* (2013.01); *H04L 63/0861* (2013.01)

(58) Field of Classification Search
CPC .. G06Q 20/042; H04L 63/083; H04L 63/0861
See application file for complete search history.

(56) References Cited

U.S. PATENT DOCUMENTS

| | | | |
|---|---|---|---|
| 4,972,476 A | 11/1990 | Nathans | |
| 7,406,445 B1 | 7/2008 | Silverbrook et al. | |
| 7,494,052 B1 | 2/2009 | Carpenter et al. | |
| 7,526,645 B2 | 4/2009 | Miyazaki et al. | |
| 8,542,921 B1 | 9/2013 | Medina | |
| 9,448,619 B1 | 9/2016 | Kerns et al. | |
| 10,049,227 B1 | 8/2018 | Sampson | |
| 2003/0025940 A1 | 2/2003 | Bessho | |
| 2006/0144924 A1 | 7/2006 | Stover | |
| 2008/0002911 A1* | 1/2008 | Eisen | H04N 1/4486 382/283 |
| 2009/0254572 A1* | 10/2009 | Redlich | G06Q 10/06 |
| 2010/0223557 A1* | 9/2010 | Kenney | G06Q 10/10 707/E17.014 |
| 2012/0314954 A1 | 12/2012 | Moore et al. | |
| 2013/0075466 A1 | 3/2013 | Clark et al. | |
| 2013/0159188 A1 | 6/2013 | Andon | |

(Continued)

FOREIGN PATENT DOCUMENTS

WO    WO-2015199832 A1 * 12/2015 ............. G06F 21/10

*Primary Examiner* — Scott C Anderson

(74) *Attorney, Agent, or Firm* — Foley & Lardner LLP

(57) ABSTRACT

A method comprises receiving a request to display a first digital image on a user device associated with a user. The first digital image is representative of a first side of a physical check, and the physical check has sensitive information in a field. Sensitive information is deleted from the first digital image so that the sensitive information is unrecoverable and unretrievable from the first digital image. After deleting the sensitive information from the first digital image, the first digital image is displayed on the user device. In response to determining that the user has failed to pass interdiction, an interdiction factor is received. In response to the interdiction factor matching a stored interdiction factor, the user is passed from interdiction. After passing the user from interdiction, a second digital image is displayed on the user device and the field is then unmasked.

7 Claims, 8 Drawing Sheets

(56) References Cited

U.S. PATENT DOCUMENTS

2014/0006205 A1    1/2014   Berry et al.
2014/0164352 A1    6/2014   Denninghoff
2015/0324762 A1   11/2015   Cook
2016/0277439 A1    9/2016   Rotter et al.
2017/0212881 A1    7/2017   Wiles et al.

* cited by examiner

SYSTEMS AND METHODS FOR CHECK MASKING AND INTERDICTION

CROSS-REFERENCE TO RELATED APPLICATIONS

The present application is a divisional of and claims priority to U.S. patent application Ser. No. 15/986,341, filed May 22, 2018 and entitled "Systems and Methods for Check Masking and Interdiction," which claims the benefit of U.S. Provisional Patent Application No. 62/618,911, filed Jan. 18, 2018 and entitled "Systems and Methods for Check Masking and Interdiction," the entire disclosures of which both are incorporated herein by reference.

TECHNICAL FIELD

The present disclosure relates generally to financial institution computing systems.

BACKGROUND

Users of a financial institution often deposit checks with the financial institution, or a third party may deposit checks with the financial institution for payment to the user. This may include a single check deposited by an individual user, or a plurality of checks, for example, accounts payable checks deposited by business users of the financial institution. The physical checks deposited with the financial institution are generally scanned so as to obtain a check image representative of the physical check, which may be stored in an accounts database of the financial institution. This provides the users of the financial institution the convenience of viewing the check image on a user device associated with the user, for example, in a banking client application or on a client portal available on a financial institution's website. The check image contains sensitive information, such as an account number, routing number, check number and authorized signature, which may be used by unauthorized personnel for fraud, such as identity theft, impersonation or fraudulent transactions.

SUMMARY

Arrangements described herein relate generally to systems and methods for check masking and interdiction and in particular, to systems and methods for masking a set of fields included in a check image displayed on a user device, and unmasking the set of fields after the user passes interdiction.

In some arrangements, a method comprises transmitting by a financial institution computing system to a user device associated with a user, a check image for displaying on the user device. The check image is representative of a physical check. A set of fields included in the check image are masked. The financial institution computing system receives from the user device, an unmask request to unmask at least a portion of the set of fields. The financial institution computing system determines if the user has passed interdiction. In response to determining that the user has not passed interdiction, the financial institution computing system transmits to the user device, an interdiction request requesting the user to provide an interdiction factor. The financial institution computing system receives from the user device, the interdiction factor. In response to the interdiction factor matching a stored interdiction factor, the financial institution computing system passes the user from interdiction. The financial institution computing system transmits to the user device an unmask command. The unmask command causes the user device to unmask at least the portion of the set of fields included in the check image.

In some arrangements, a method comprises receiving, by a user device associated with a user, a request to display a check image corresponding to a physical check. The user device displays the check image such that a set of fields included in the check image are masked. The user device receives an unmask request to unmask at least a portion of the set of fields. The user device transmits the unmask request to a financial institution computing system. The user device receives an unmask command from the financial institution computing system. The financial institution computing transmits the unmask command in response to the user having passed interdiction. The user device unmasks at least the portion of the set of fields included in the check image.

In some arrangements, a financial institution computing system comprises a network interface structured to facilitate data communication via a network, a memory and a processing circuit comprising a processor. The processing circuit is configured to transmit to a user device associated with a user, a check image for displaying on the user device. The check image is representative of a physical check. A set of fields included in the check image are masked. The processing circuit is configured to receive from the user device an unmask request to unmask at least a portion of the set of fields. The processing circuit determines if the user has passed interdiction. In response to determining that the user has not passed interdiction, the processing circuit is configured to transmit an interdiction request to the user device requesting the user to provide an interdiction factor. The processing circuit receives from the user device, the interdiction factor. In response to the interdiction factor matching a stored interdiction factor, the processing circuit passes the user from interdiction. The processing circuit transmits an unmask command to the user device. The unmask command causes the user device to unmask at least the portion of the set of fields included in the check image.

In some arrangements a method comprises receiving a request to display a check image on a user device associated with a user. The check image is representative of a physical check. The check image is displayed on the user device such that a set of fields included in the check image are masked. An unmasking request is received. It is determined if the user has passed interdiction. In response to determining that the user has not passed interdiction, an interdiction factor is received. In response to the interdiction factor matching a stored interdiction factor, the user is passed from interdiction, and at least the portion of the set of fields included in the check image are unmasked.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
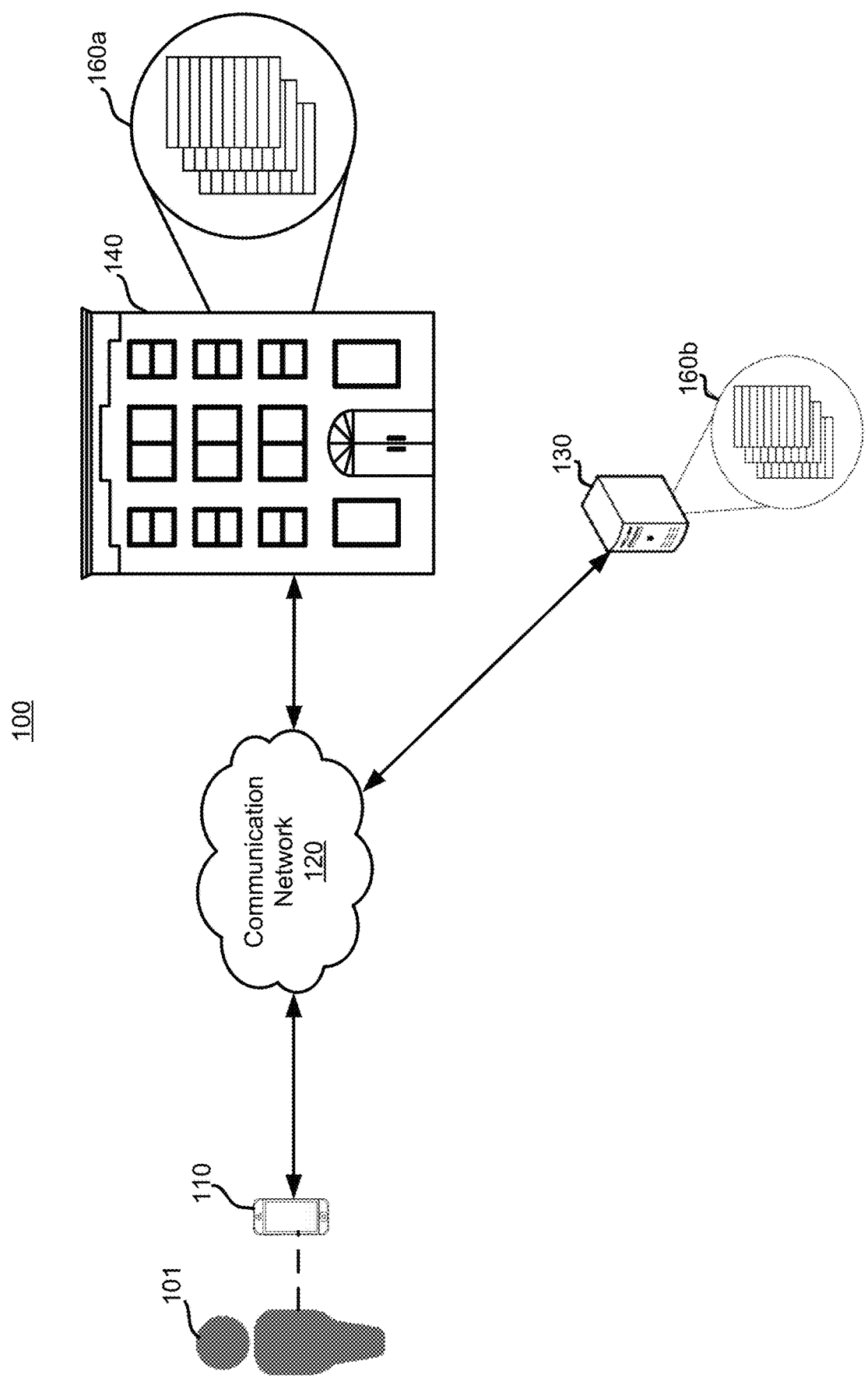
FIG. 1 is a diagram of a system for check masking and interdiction, according to an arrangement.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Arrangements described herein relate generally to systems and methods for check masking and interdiction, and in particular to systems and methods for masking a set of fields included in a check image displayed on a user device, and unmasking the set of fields after the user passes interdiction.

Financial institutions generally provide the users of the financial institution the convenience of viewing a check image of physical check deposited with the financial institution on a banking client application available on a user device associated with the user, or on a client portal available on a financial institution's website. The check image generally contains sensitive information including, for example, an account number, routing number, check number and authorized signature. This information needs to be protected and made available only to those users who are authorized to view this information. In some instances, an authorized user may view the check image on a user device (e.g., a cell phone or laptop) at a public place (e.g., a coffee shop, library, public transport or any other public place) where other people around the user may have an opportunity to inadvertently or deliberately view the sensitive information on the check image. In other instances, a user may be an employee of a business client of the financial institution who is authorized to view the check image but not the sensitive information thereon. In still other instances, an unauthorized user (e.g., an identity thief or a hacker) may be able to access the check image and obtain the sensitive information therefrom.

Various arrangements of the systems and methods described herein provide for selective masking of a set of fields included in a check image displayed on a user device to a user who may have passed initial authentication, but has not passed interdiction. Once the user passes interdiction, the set of fields can be unmasked for the user to see. As used herein, the term "interdiction" implies an additional protective layer (i.e., the masking of the set of fields), which is imposed on a check image displayed to an otherwise authenticated user on a user device. In other words, interdiction provides another level of authentication to protect sensitive information included in the set of fields from unauthorized users, such that only users who pass interdiction are deemed to be authorized to view the set of fields, and may selectively do so. For example, in some arrangements, interdiction requires multiple interdiction factors and/or certain types of interdiction factors, which may or may not be the same as the authentication factors that are required to provide the user access to the banking application. For example, in one arrangement, authentication requires one secret knowledge factor and interdiction requires multiple secret knowledge factors or one secret knowledge factor and one biometric factor. It should be appreciated that while the concepts included in this application are described in the context of check masking and interdiction, the same concepts can be used for masking and interdicting a visual image of any other secure document such as, for example, medical documents, personal records, classified or secure documents, or any other document which includes sensitive fields.

In some arrangements, a method for check masking and interdiction comprises transmitting, by a financial institution computing system to a user device associated with a user, a check image for displaying on the user device. The check image is representative of a physical check. The check image is displayed such that a set of fields included in the check image are masked. In some arrangements, the masked fields include at least one of a signature, a routing number, an account number and a check number. In various arrangements, the method also includes masking, by the financial institution computing system, a plurality of predetermined areas on the check image that correspond to a location of each of the set of fields on the check image. In other arrangements, the method may include identifying, by the financial institution computing system, the set of fields on the check image using at least one of machine vision and text recognition. The financial institution computing system masks the identified set of fields. The financial institution computing system may be configured to mask the set of fields using various processes or a combination thereof. In some arrangements, the masking includes overlaying an image over the set of fields on the check image. In other arrangements, the masking includes displaying a partial view of the check image on the user device. In still other arrangements, the masking includes removing the set of fields or replacing the set of fields on the check image.

In some arrangements, the user may only view the check if the user is authenticated. For example, the method may include receiving, by the financial institution computing system from the user device, an authentication factor. The authentication factor may include, for example, a password and/or a biometric sample. The financial institution computing system determines if the authentication factor matches a stored secret knowledge factor. In response to the authentication factor matching the stored secret knowledge factor, the financial institution computing system authenticates the user. The authentication enables the user to view the check image on the user device with the set of fields included in the check image being masked.

The financial institution computing system receives from the user device, an unmask request to unmask at least a portion of the set of fields. The financial institution computing system determines if the user has passed interdiction. In response to determining that the user has not passed interdiction, the financial institution computing system transmits to the user device, an interdiction request requesting the user to provide an interdiction factor. In particular arrangements, the financial institution computing system may transmit to the user device, the interdiction factor along with the interdiction request which instructs the user to enter the interdiction factor into the user device. In some arrangements, the interdiction factor may include a numeric passcode. In other arrangements, the interdiction factor may include a password and/or a biometric sample.

The financial institution computing system receives from the user device the interdiction factor and matches the interdiction factor to a stored interdiction factor. In response to the interdiction factor matching the stored interdiction factor, the financial institution computing system passes the user from interdiction. Furthermore, the financial institution computing system transmits to the user device an unmask command which causes the user device to unmask at least a portion of the set of fields included in the check image. In some arrangements, the check image displayed to the user before passing interdiction is a first check image with the set of fields being masked. In such arrangements, the unmask command is configured to transmit, from the financial institution to the user device, a second check image of the physical check in which the set of fields included therein are unmasked. In particular arrangements, the unmask command is configured to enable the user to selectively mask and unmask the set of masked fields included in the check image on the user device. In some arrangements, the check image includes a front view and a back view such that only the front view is accessible on the user device before the user has passed interdiction. The financial institution computing system may allow the user to selectively access the back view after the user has passed interdiction.

In some arrangements, the check image may include a first check image and the user may want to view a second check image, which is representative of a second check different from the first check, on the user device. In such arrangements, the financial institution computing system may receive from the user device, a second unmask request to unmask at least a portion of a set of fields included in the second check image. In response to determining that the user had previously passed interdiction, the financial institution computing system may transmit to the user device, a second unmask command configured to cause the user device to unmask at least the portion of the set of fields included in the second check image. In still other arrangements, once the user passes interdiction the financial institution computing system generates an authenticated user session associated with user device. The user may access a plurality of check images on the user device during the authenticated user session. At least a portion of a set of fields included in each of the plurality of check images may be masked. In such arrangements, the unmask command may cause the user device to unmask at least the portion of the set of masked fields included in each of the plurality of check images during the authenticated user session.

Arrangements of the systems, apparatuses, and methods described herein may provide several benefits, including, for example: (1) protecting sensitive information included in check images by using interdiction and masking the set of fields included on the check image that include the sensitive information; (2) allowing some personnel who may need to view one or more check images to view non-sensitive information such as payee name and amount, while preventing sensitive information, such as payee signature from being viewed by the personnel via masking; (3) using the interdiction factor as an additional authentication factor to ensure that only authorized users may be able to view the set of fields on the check image; (4) providing the user the flexibility to selectively mask and unmask the set of fields after passing interdiction; and (5) enabling the user to view a plurality of check images without interdiction once the user initially passes interdiction.

FIG. 1 is a diagram of an example system 100 for check masking and interdiction, and, particularly, for masking a set of fields including sensitive information on a check image displayed to a user 101 on a user device 110 associated with the user 101 and unmasking the set of fields once the user 101 passes interdiction. Referring to FIG. 1, the user 101 may include at least one of a customer of a financial institution 140 (e.g., an individual user or a business) or an employee thereof. In some arrangements, the user 101 may be an account holder of at least one financial account at the financial institution 140. The user 101 may deposit one or more physical checks with the financial institution 140 or the financial institution 140 may receive one or more checks to be deposited into an account associated with the user 101. The financial institution 140 may acquire an image of the one or more checks (e.g., scan each check or take a picture thereof) and associate the one or more checks with the user account. The one or more checks include a plurality of fields, for example, a name and address of the issuer of the check, a check number, an issuing bank, an account number, a routing number, and/or a signature of the issuer of the check. A set of fields included in the one or more checks may include sensitive information such as, for example, the signature, the routing number, the account number and the check number associated with the issuer, which have to be protected from viewing by unauthorized personnel.

The user 101 may be authorized to view the one or more check images associated with the user 101 but may or may not be authorized to view sensitive information (e.g., account number, signature, etc.) included in the check image. For example, in some arrangements, the user 101 may be the issuer and signatory of the check or an authorized representative of the user 101 who may be authorized to view the sensitive information on the check. In other arrangements, the user 101 may be authorized to view the check image but not the sensitive information included therein. For example, the user 101 may be an employee of a business who may be authorized to view check issuer name and address, and/or monetary information included in the check image, but is not authorized to view the sensitive information. In still other arrangements, the user 101 may be authorized to view the set of fields associated with the sensitive information on the check image but may be viewing the information at an unsecure location, for example, a public place (e.g., a library, a coffee shop, public transportation, etc.) where unauthorized personnel may have the opportunity to view the sensitive information. In yet other arrangements, the user 101 may be viewing the check image on a device not associated with the user, for example, a public computer or a user device 110 having an IP address not generally associated with the user 101.

While shown as a brick and mortar facility, in some arrangements, the financial institution 140 may include an online-only financial institution. The user 101 operates or is otherwise associated with the user device 110, for communication with the financial institution 140 (e.g., a financial institution computing system 242 of the financial institution 140, as described with respect to FIG. 2). The user device 110 may include, for example, a mobile phone (e.g., an iPHONE®, an ANDROID® phone, a WINDOWS® phone, a SYMBIAN® phone, or the like), a tablet computer, a personal computer (e.g., a desktop or a laptop), a smart TV, a smart watch, a gaming system, an IP TV box, or any other user device.

The user 101 may operate the user device 110 to access financial products and/or services provided by the financial institution 140, and/or receive notifications therefrom, and view one or more check images on the user device 110. According to non-limiting examples, the user 101 may use a mobile wallet or client portal provided by the financial institution 140 to view one or more checks on the user device 110. In other arrangements, the user 101 may also use the mobile wallet or online payment features to deposit checks with the financial institution 140 (e.g., by capturing an image of the checks using an image capture device such as a camera associated with the user device 110), enroll in a check masking an interdiction program, input an interdiction factor for unmasking a set of masked fields on the check image (e.g., the set of fields corresponding to the sensitive information), and/or selectively mask and unmask the set of fields. The mobile wallet or online payment features may be provided through software applications on the user device 110.

The user device 110 is connected to the financial institution 140 (e.g., a financial institution computing system 242 of FIG. 2) via a communication network 120. The communication network 120 is any suitable Local Area Network (LAN) or Wide Area Network (WAN). For example, the communication network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combination thereof, and/or the like. The communication network 120 is structured to permit the exchange of data, values, instructions, messages, and the like between the user device 110 and the financial institution 140 (e.g., the financial institution computing system 242 of FIG. 2).

A financial information database 160*a* may store personal information of the user 101 (e.g., account number, address, etc.) as well as transaction history of the user 101. The financial information database 160*a* may also include check images of one or more physical checks associated with the user 101, for example, checks deposited with the financial institution 140 by the user 101, deposited on behalf of the user 101, or deposited with the financial institution 140 for payment to the user 101. The financial information database 160*a* may also store information on one or more secret knowledge factors associated with the user 101. The user 101 may be required to enter the one or more authentication factors comprising the secret knowledge factor to access the user account information (e.g., the one or more check images) stored in the financial information database 160*a*. Authentication factors for access control systems may include "something-you-know," "something-you-have," and/or "something-you-are" factors. Authentication factors may include "something-you-know" factor, for example, a user name, and a password (e.g., an alphanumeric password), or a pass code (e.g., a numeric passcode). A password is a "something-you-know" authenticator, that may include a string of characters that have an equivalent representation shared by communicating parties. In other arrangements, the authentication factor may additionally or alternatively include a "something-you-are" factor, for example, a biometric sample such as a thumb-print, face recognition, retina capture, iris spacing, hand gestures, foot gestures, voice pattern, etc.

For example, the check masking and interdiction may be performed if the user 101 had previously enrolled in a check masking and interdiction program. In some arrangements, the financial institution 140 may request the user 101 to enter a personal identification code (e.g., a personal identification number (PIN), a password, a two factor authentication, last four digits of the user's 101 social security number, etc.) before enrolling the user 101 in the check masking and interdiction program, or otherwise allowing the user 101 to view the check image with interdiction (i.e. a set of fields of the check image that include sensitive information being masked).

In some arrangements, the financial institution 140 is also in communication with an third party computing system 130 that may include a third party database 160*b* including a repository of the check images (e.g., a payroll service or a debt collection service) and/or store authentication information. For example, the third party computing system 130 may include biometric service provide (BSP) computing system configured to store biometric reference templates for receiving a biometric sample as the authentication factor from the user 101 and handles biometric matching requests from the financial institution 140. In some arrangements, the user 101 may have enrolled with the BSP and created a biometric reference template. In particular arrangements, the BSP computing system may be included in the financial institution 140. In other arrangements, the third party computing system 130 may comprise a time stamp authority (TSA) computing system managed by any trusted time authority that can provide a time stamp token (TST) for a piece of information. The trusted time authority can be one that complies with the X9.95 standard, or those defined in similar standards by ISO/IEC/IETF and satisfies legal and regulatory requirements. The TSA computing system may be structured to negotiate a trusted TST and generate a trusted TST for the information for future verification (e.g., a TST for generating an authenticated user session to allow the user 101 to view a plurality of check images without masking).

The user 101 may wish to view the check image on the user device 110. For example, the financial institution 140 may receive from the user device 110, an authentication factor, for example, a password or a biometric sample configured to allow a user to access a banking client application, a mobile wallet application, a web portal or a local application configured to allow the user 101 to view a check image on the user device 110. The financial institution 140 determines if the authentication factor matches a stored secret knowledge factor. In response to the authentication factor matching the stored secret knowledge factor, the financial institution 140 authenticates the user 101, thereby enabling the user to view the check image on the user device 110 with the set of fields included in the check image being masked. Expanding further, the financial institution 140 may transmit to the user device 110 a check image for displaying on the user device 110. The check image is representative of a physical check. The check image is displayed such that a set of fields included in the check image are masked, blocked, scrambled, redacted or otherwise, not visible or legible on the check image. The set of fields may include sensitive information such as, for example, a signature, a routing number, an account number and a check number.

The financial institution 140 may receive from the user device 110 an unmask request to unmask at least a portion of the set of fields. For example, the user 101 may wish to unmask a routing number and/or a bank account number included in the check image, but keep the signature masked. In other arrangements, the user 101 may wish to unmask the check number, but keep the other sensitive information unmasked. In still other arrangements, the user 101 may wish to unmask the signature but keep the other sensitive information masked.

The financial institution 140 determines if the user 101 has passed interdiction or otherwise, is authorized to view the check image with the sensitive fields unmasked. Thus, interdiction provides a secondary level of protection, by allowing a user 101 to view the check image after an initial authentication with the set of fields including sensitive information being masked, and removing the masking of the set of fields, only after the user 101 passes interdiction. In response to determining that the user 101 has not passed interdiction, the financial institution 140 transmits an interdiction request to the user device 110 requesting the user 101 to provide an interdiction factor. The interdiction factor may include a "something-you-know" or "something-you-are" factor, for example, a password, a passcode or a biometric sample. In some arrangements, the financial institution 140 may transmit to the user device 110, the interdiction factor along with the interdiction request. For example, the interdiction request may include a text message, an email and/or a phone call to the user 101, and the interdiction factor may include a password transmitted to the user device 110. In other arrangements, the interdiction request may include a text message or an email to the user device 110 instructing the user 101 to call or otherwise contact the financial institution 140 to obtain the interdiction factor. The interdiction request may instruct the user 101 to enter the interdiction factor into the user device 110 (e.g., into a dialogue box or window displayed thereon).

The financial institution 140 receives the interdiction factor from the user device 110 and may compare the interdiction factor with a stored interdiction factor. In response to the interdiction factor matching the stored interdiction factor, the financial institution 140 passes the user 101 from interdiction. Furthermore, the financial institution 140 transmits an unmask command to the user device 110, which causes the user device 110 to unmask at least a portion of the set of fields included in the check image.

Figure 2:
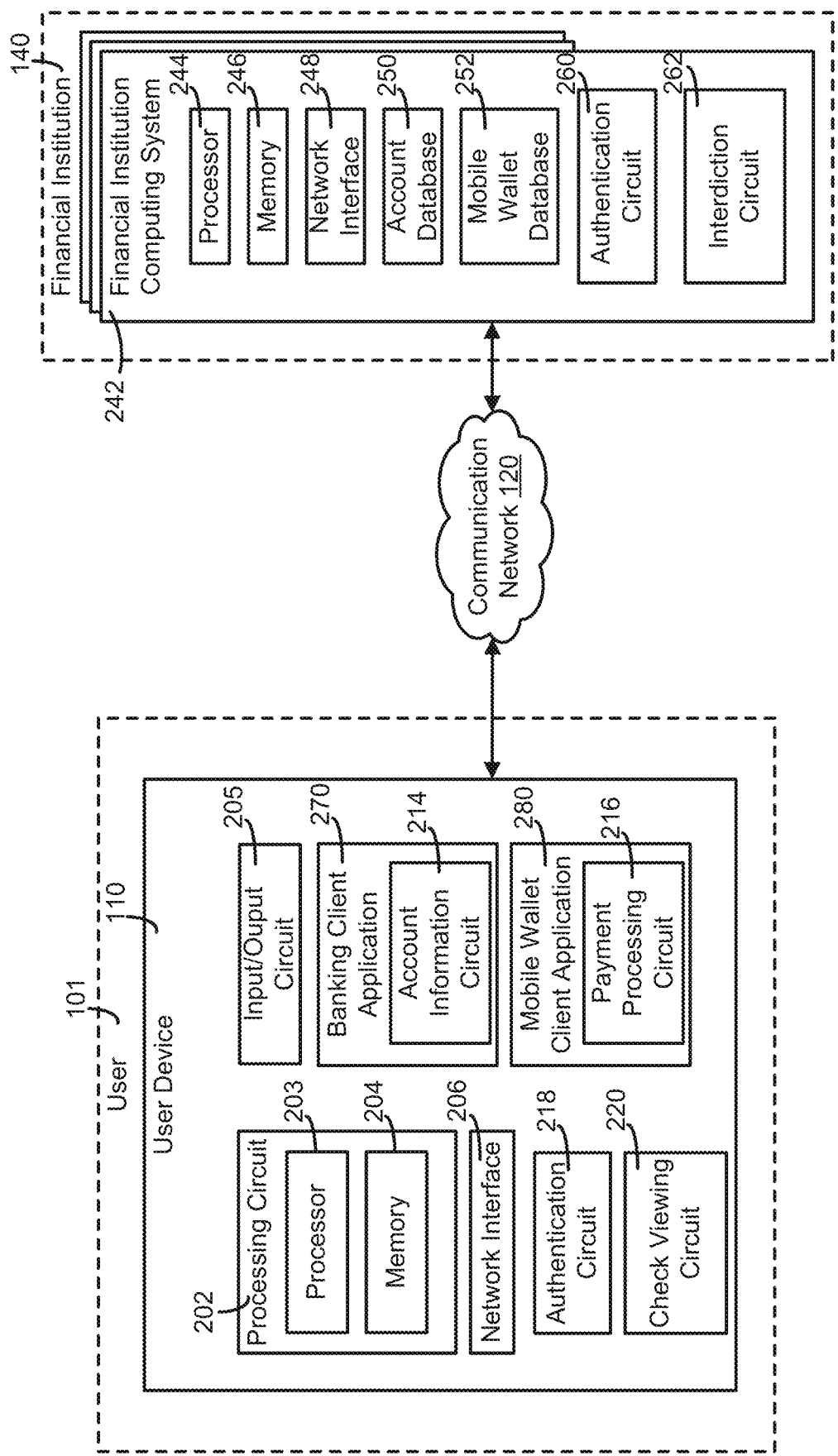
FIG. 2 is a diagram of a user device and a financial institution computing system of FIG. 1, according to some arrangements.

FIG. 2 is a diagram of an example of the user device 110 and the financial institution 140 of the system 100 as set forth in FIG. 1 according to some arrangements. Referring to FIGS. 1-2, the financial institution 140 includes one or more of a bank branch, a loan office, a mortgage office, a financial service office, a retail office, an ATM location, a combination thereof, and/or the like. The financial institution 140 has at least one associated financial institution computing system 242.

The financial institution 140 provides financial products and services such as, but not limited to, credit card accounts, mobile wallet, checking/savings account, retirement accounts, mortgage accounts, loan accounts, investment and financial accounts, and the like to the user 101 via the financial institution computing system 242. The financial institution computing system 242 includes a processor 244 and a memory device 246. The processor 244 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 246 (e.g., Random Access Memory (RAM), Read-Only Memory (ROM), Non-volatile RAM (NVRAM), Flash Memory, hard disk storage, etc.) stores data and/or computer code for facilitating at least some of the various processes described herein. The memory 246 includes tangible, non-transient volatile memory, or non-volatile memory. The memory 246 may include a non-transitory processor 244 readable medium having stored programming logic that, when executed by the processor 244, controls the operations of the financial institution computing system 242. In some arrangements, the processor 244 and the memory 246 form various processing circuits described with respect to the financial institution computing system 242 (e.g., the authentication circuit 260 and the interdiction circuit 262).

As shown, the financial institution computing system 242 includes a network interface 248. The network interface 248 is structured for sending and receiving data over the communication network 120 (e.g., to and from the user device 110, etc.). Accordingly, the network interface 248 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The financial institution computing system 242 includes an account database 250 that stores customer information and account information relating to one or more accounts held by the user 101 with the financial institution 140. For example, the account database 250 may be included in the financial information database 160a. In this regard, more than one financial institution (such as, but not limited to, the financial institution 140) with an associated financial institution computing system (such as, but not limited to, the financial institution computing system 242) can be communicably coupled to the components of FIG. 2 over the communication network 120 to access the accounts held by the user 101. The account database 250 may store transaction history of transactions made by the user 101 using one or more accounts of the user 101, for example, with the banking client application 270, the mobile wallet client application 280, or with other suitable applications. Furthermore, the account database 250 may store a plurality of check images associated with checks deposited by the user 101, on behalf of the user 101 and/or deposited with the financial institution 140 for payment to the user 101.

The financial institution computing system 242 may include a mobile wallet database 252 for storing mobile wallet accounts of users, including the user 101. The mobile wallet accounts permit payments via a mobile wallet client application 280 of the user device 110. The mobile wallet database 252 may store transaction history of transactions made by the user 101 using the mobile wallet client application 280.

The financial institution computing system 242 includes an authentication circuit 260. The authentication circuit 260 may be configured to authenticate a user 101 so as to enable the user 101 to view a check image on the user device 110. For example, the account database 250 may be configured to store a secret knowledge factor associated with the user 101. The user 101 may enter an authentication factor corresponding to the secret knowledge factor on the user device 110, for example, within a banking client application 270 or mobile wallet client application 280 available on the user device 110. In some arrangements, the financial institution computing system 242 may be configured to receive the authentication factor, for example, a password, a user name and password combination, a biometric sample, or any other authentication factor, from the user device 110 via the communication network 120. The authentication circuit 260 may be configured to compare the authentication factor to the stored secret knowledge factor and determine if the authentication factor matches the secret knowledge factor. In response to the authentication factor matching the stored secret knowledge factor, the authentication circuit 260 of the financial institution computing system 242 may authenticate the user 101, so as to enable the user 101 to view the check image on the user device 110 with a set of fields (e.g., corresponding to sensitive information) included in the check image being masked.

The financial institution computing system 242 also include an interdiction circuit 262. The interdiction circuit 262 is configured to transmit the check image, which is representative of a physical check, to the user device 110 and mask a set of fields included in the check image (i.e., the transmit the check image to the user device 110 with interdiction). The set of fields may correspond to sensitive information, as previously described herein, and may be masked even if the authentication circuit 260 initially authenticated the user 101. The interdiction circuit 262 may also be configured to receive an interdiction factor from the user device 110, and pass the user 101 from interdiction if the interdiction factor matches a stored interdiction factor enabling the user 101 to unmask the set of masked fields included in the check image on the user device 110, as described in further detail herein.

The authentication circuit 260 and the interdiction circuit 262 are operably coupled to one or more of the components of the financial institution computing system 242. For example, the authentication circuit 260 and the interdiction circuit 262 may be coupled to the network interface 248 for communicating with one or more of the user device 110 and the third party computing system 130 via the communication network 120.

In some examples, the authentication circuit 260 and the interdiction circuit 262 may be implemented with the processor 244. For example, the authentication circuit 260 and the interdiction circuit 262 may be implemented as software applications stored within the memory 246 and executed by the processor 244. Accordingly, such examples can be implemented with minimal or no additional hardware costs. However, other implementations may rely on dedicated hardware specifically configured to perform operations of the authentication circuit 260 and the interdiction circuit 262.

The authentication circuit 260 and the interdiction circuit 262 may be coupled to one or more of the account database 250 or the mobile wallet database 252 to access information stored thereon with respect to an identity of the user 101 (e.g., a secret knowledge factor and/or biometric reference sample associated with the user 101), and/or to pass the user 101 from interdiction (e.g., the interdiction factor). In some arrangements, the financial institution computing system 242 includes or is otherwise operatively coupled to the financial information database 160a.

As shown, the user 101 operates or is associated with the user device 110. In some arrangements, the user device 110 includes a processing circuit 202 having a processor 203 and memory 204. The processor 203 is implemented as a general-purpose processor, an ASIC, one or more FPGAs, a DSP, a group of processing components that are distributed over various geographic locations or housed in a single location or device, or other suitable electronic processing components. The memory 204 may include a non-transitory, processor readable medium (e.g., RAM, NVRAM, ROM, Flash Memory, hard disk storage, etc.) that stores data and/or computer code for facilitating the various processes described herein. Moreover, the memory 204 is or includes tangible, non-transient volatile memory or non-volatile memory. Accordingly, the memory 204 includes database components, object code components, script components, or any other type of information structure for supporting the various activities and information structures described herein.

The user device 110 is shown to include various circuits and logic for implementing the activities described herein. More particularly, the user device 110 includes one or more of a processing circuit 202, input/output circuit 205, network interface 206, authentication circuit 218, check viewing circuit 220, account information circuit 214, payment processing circuit 216, or the like. While various circuits, interfaces, and logic with particular functionality are shown, it should be understood that the user device 110 includes any number of circuits, interfaces, and logic for facilitating the functions described herein. For example, the activities of multiple circuits are combined as a single circuit and implemented on a same processing circuit (e.g., the processing circuit 202), as additional circuits with additional functionality are included.

The network interface 206 is configured for and structured to establish a communication session via the communication network 120 with the financial institution computing system 242. Accordingly, the network interface 206 is an interface, such as, but not limited to, the network interface 248.

The input/output circuit 205 is configured to receive user input from and provide information to the user 101. In this regard, the input/output circuit 205 is structured to exchange data, communications, instructions, etc. with an input/output component of the user device 110. Accordingly, in some arrangements, the input/output circuit 205 includes an input/output device, such as a display device, touchscreen, keyboard, microphone, a finger print reader, and/or the like. In some arrangements, the input/output circuit 205 includes communication circuitry for facilitating the exchange of data, values, messages, and the like between the input/output device and the components of the user device 110. In some arrangements, the input/output circuit 205 includes machine-readable media for facilitating the exchange of information between the input/output device and the components of the user device 110. In still another arrangements, the input/output circuit 205 includes any combination of hardware components (e.g., a touchscreen), communication circuitry, and machine-readable media.

One or more of the banking client application 270 or mobile wallet client application 280 are server-based applications executable on the user device 110. In this regard, the user 101 has to first download the application(s) prior to usage. In another arrangement, the banking client application 270 and/or mobile wallet client application 280 are coded into the memory 204 of the user device 110. In still another arrangement, the banking client application 270 and/or the mobile wallet client application 280 are web-based interface applications. In this configuration, the user 101 has to log onto or otherwise access the web-based interface before usage. In this regard, at least one of the banking client application 270 and mobile wallet client application 280 is supported by a separate computing system (e.g., the financial institution computing system 242 and/or the third party computing system 130) comprising one or more servers, processors, network interface modules, etc. that transmit the applications for use to the user device 110. In certain arrangements, one or more of the banking client application 270 and/or the mobile wallet client application 280 includes an Application Programming Interface (API) and/or a Software Development Kit (SDK) that facilitate integration of other applications. All such variations and combinations are intended to fall within the spirit and scope of the present disclosure.

The banking client application 270 is communicably coupled to the financial institution computing system 242 (e.g., the account database 250 and/or the mobile wallet database 252) via the communication network 120 using the network interface 206, and is structured to permit management of at least one account of the user 101 via the banking client application 270. In this regard, the banking client application 270 provides displays indicative of account information such as, but not limited to, current account balances, pending transactions, profile information (e.g., contact information), reward associated with the account, bill pay information and/or the like. Further, in some arrangements, the banking client application 270 is configured to process payments from the user 101 to a designated recipient. For example, the banking client application 270 depicts a loan (e.g., a mortgage, a personal loan, a car loan, a student loan, etc.) of the user 101 and allows the user 101 to pay the loan from an account (e.g., a checking or savings account associated with the user 101). In some examples, a bill pay option is provided by the banking client application 270, where the bill pay option allows the user 101 to pay his/her bills in response to user input. Moreover, the banking client application 270 may also allow the user 101 to view one or more check images, which may be received from the financial institution computing system 242, on the user device 110. The banking client application 270 may also allow the user 101 to deposit one or more checks with the financial institution computing system 242.

As mentioned herein the user 101 pays bills (e.g., mortgage, etc.), views balances, pays merchants, and otherwise manages the user's 101 account, via the banking client application 270. Accordingly and as shown, the banking client application 270 includes an account information circuit 214. The account information circuit 214 is linked or otherwise coupled to one or more accounts (as stored in the account database 250) held by the user 101 and permits management of the associated accounts (e.g., transfer balances between accounts, view payment history, etc.) by communicating with the financial institution computing system 242. The banking client application 270 is communicably coupled to the mobile wallet client application 280. As such, in response to a mobile payment via the mobile wallet client application 280, the mobile wallet client application 280 causes the banking client application 270 to update the payment account (i.e., the account that supported the mobile payment). As such, the banking client application 270 and the mobile wallet client application 280 are communicably coupled to each other to enable actions supported by each respective application.

The mobile wallet client application 280 is communicably coupled to the financial institution computing system 242 (e.g., the mobile wallet database 252) via the communication network 120 and is structured to facilitate purchases by the user 101 via the mobile wallet client application 280. Accordingly, the mobile wallet client application 280 is linked or otherwise connected to one or more accounts (e.g., stored in the account database 250) of the user 101. In operation, when at a point-of-sale terminal, the user 101 initiates the mobile wallet client application 280 and provides a passcode (e.g., biometrics such as a thumbprint, facial recognition or retinal identification, a Personal Identification Number (PIN), a password, etc.) to authenticate the user 101 and select the source payment account desired (e.g., a checking account from a particular financial institution that is linked to the mobile wallet client application 280). Via communication with the payment terminal (e.g., via near field communication), the aforementioned payment information is provided to the POS terminal or the merchant (e.g., via NFC, via barcode presentment, etc.) and the payment is processed. Beneficially, carrying payment cards is avoided or reduced via the mobile wallet client application 280.

As mentioned herein, the mobile wallet client application 280 is structured to facilitate and permit payments by interfacing with an account held by the user 101 at the financial institution 140. Accordingly, the mobile wallet client application 280 is communicably coupled to the financial institution computing system 242 via the network interface 206 over the communication network 120. As shown, the mobile wallet client application 280 includes a payment processing circuit 216 structured to facilitate payments by the user 101 via the mobile wallet client application 280. For example, the payment processing circuit 216 enables a quick-pay capability with a merchant. In this regard, the payment processing circuit 216 includes or is communicably coupled with a communication device (e.g., a near-field communication chip) that facilitates the exchange of information between the mobile wallet client application 280 and a POS terminal.

In some arrangements, the user device 110 includes an authentication circuit 218. The authentication circuit 218 may be operably coupled to one or more of the components of the user device 110, such as the input/output circuit 205, the banking client application 270 and/or the mobile wallet client application 280. The authentication circuit 218 may be configured to prompt the user 101 to enter an authentication factor (e.g., a user name and/or a password, or a biometric sample), for example via the input/output circuit 205 to authenticate the user 101 before allowing the user to access the banking client application 270 and/or the mobile wallet client application 280.

The authentication circuit 218 may be in communication with the authentication circuit 260 of the financial institution computing system 242 via the communication network 120. The authentication circuit 218 may receive the authentication factor from the user 101 and communicate the authentication factor to the financial institution computing system 242 for matching with the stored secret knowledge factor. Once the user 101 is authenticated, the authentication circuit 218 may receive an authentication command from the financial institution computing system 242, authenticating the user 101. The authentication circuit 218 may then allow the user 101 to access the banking client application 270, for example, to view one or more check images with the set of fields included in the check image being masked. Furthermore, the authentication circuit 218 may also be configured to receive an interdiction factor from the user 101 for allowing the user 101 to view the check image with the set of fields unmasked.

In some arrangements, the user device 110 also includes a check viewing circuit 220. The check viewing circuit 220 may also be configured to receive the one or more check images from the financial institution computing system 242. The check viewing circuit 220 may be operably coupled to the input/output circuit 205, the banking client application 270, and/or the mobile wallet client application 280. The check viewing circuit 220 may be configured to allow the user 101 to view the one or more check images on the banking client application 270 through the input/output circuit 205. The financial institution computing system 242, for example, the interdiction circuit 262 may transmit to the check viewing circuit 220, the check image once the user 101 has initially been authenticated by the authentication circuit 260 of the financial institution computing system 242. The set of fields included in the check image may be masked, and are unmasked once the user 101 passes interdiction. In some arrangements, the masking or unmasking of the set of fields of the check image is performed by the interdiction circuit 262. In other arrangements, the interdiction circuit 262 may communicate instructions to the check viewing circuit 220 to mask or unmask the set of fields included in the check image displayed on the user device 110.

According to some arrangements, in operation, the authentication circuit 260 may receive an authentication factor from the user device 110. For example, the user 101 may want to view one or more check images on the user device 110 (e.g., via the banking client application 270). The authentication circuit 218 of the user device 110 may prompt the user 101 to enter an authentication factor (e.g., a password and/or a biometric sample), and receive the authentication factor from the user 101. The authentication circuit 218 may transmit the authentication factor to the authentication circuit 260 of the financial institution computing system 242. The authentication circuit 260 may determine if the authentication factor matches a stored secret knowledge factor (e.g., stored in the account database 250). For example, the user 101 may have registered the secret knowledge factor with the financial institution computing system 242 (e.g., during an initial registration process). In response to the authentication factor matching the stored secret knowledge factor, the authentication circuit 260 may authenticate the user 101. For example, the user device 110 may receive from the financial institution computing system 242, an authentication command authenticating the user 101 in response to the authentication factor matching the stored secret knowledge factor The authentication may be an initial authentication which may allow the user 101 to view one or more check images on the user device 110 with a set of fields (e.g., corresponding to sensitive information) included in the check image being masked.

In some arrangements, the user device 110 may receive a request to view a check image from the user 101, and transmit the request to the financial institution computing system 242. The interdiction circuit 262 may transmit the check image to the user device 110 with the set of fields included in the check image being masked. The check viewing circuit 220 may display the check image on the user device 110 with the set of fields being masked. In some arrangements, the interdiction circuit 262 may be configured to mask or unmask the set of fields (e.g., a signature, a routing number, an account number and/or a check number) on the check image. This may be provide a higher level of security as the masking and/or unmasking process is performed remote from the user device 110, limiting the possibility of hacking or circumventing the financial institution computing system 242 to view the set of fields. In other arrangements, the interdiction circuit 262 may instruct the check viewing circuit 220 to selectively mask or/unmask the set of fields locally on the user device 110. This may allow faster processing, thereby providing a smoother experience to the user 101.

In some arrangements, the interdiction circuit 262 or the check viewing circuit 220 may be configured to mask a plurality of predetermined areas on the check image which correspond to a set of locations of the set of fields on the check image. For example, a significant majority of the check images stored in the account database 250 may follow a standard template such that the check image may have the same size (e.g., the same length and width), and the signature line, the routing number, the account number, the check number and any other sensitive fields included in the check image may be located at substantially the same location on the check. Masking the predetermined locations may therefore, mask or substantially mask the set of fields (e.g., mask more than 95% of the area corresponding to the set of fields). Masking the predetermined areas may use less computing power and/or memory because no additional computing may have to be performed to mask the areas beyond determining whether the user 101 has passed interdiction. Masking the predetermined areas may also require less data transmission. For example, the check viewing circuit 220 may be configured to mask the set of fields, with the interdiction circuit 262 only instructing the check viewing circuit 220 to mask or unmask the set of fields.

In some arrangements, the financial institution computing system 242 (e.g., the interdiction circuit 262) may be configured to identify the set of fields on the check image using at least one of machine vision and text recognition. The financial institution computing system 242 may then mask the identified set of fields. The machine vision or text recognition may be performed using any suitable image processing algorithm and may be performed by the interdiction circuit 262 or the check viewing circuit 220. The machine vision or text based recognition of the set of fields may provide higher accuracy in recognizing and masking the set of fields included in the check image, but may require higher processing power and/or memory relative to masking the predetermined locations on the check image, as previously described herein.

Various arrangements may be used to mask the set of fields on the check image. In some arrangements, the masking may include overlaying an image over the set of fields on the check image. For example, the interdiction circuit 262 or the check viewing circuit 220 may be configured to overlay a horizontal or vertical bar, a plurality of horizontal lines, a plurality of vertical lines, cross-hatch, an opaque text box with text written on it (e.g., "field masked," "field interdicted," "masked for security" and the like), a plurality of symbols (e.g., letters such as a plurality of X's or a numerals) or any other suitable image at predetermined locations of the check image corresponding to the set of fields, or at locations of the set of fields as determined by machine vision or text recognition. Such arrangements may require less computing power and/or memory for masking the set of fields and may be performed locally at the user device 110, for example, by the check viewing circuit 220.

In other arrangements, the masking may include displaying a partial view of the check image on the user device 110. For example, a check image may include a routing number and an account number displayed at a bottom portion of the check image, and the interdiction circuit 262 or the check viewing circuit 220 may be configured to display the check image such that the bottom portion is cropped or, otherwise excluded from being displayed on the user device 110. In particular arrangements, a predetermined area is displayed on the user device 110 so as to exclude the interdicted area (e.g., the bottom portion of the check). Interdiction by displaying only a partial view of the check may use less computing power and/or memory as complex image processing operations may not have to be performed to achieve the interdiction.

In yet other arrangements, the masking may include removing the set of fields or replacing the set of fields. For example, the interdiction circuit 262 may recognize the set of fields via machine vision, and virtually erase the set of fields from the check image during interdiction, or replace with characters (e.g., a plurality of letters such as "X's" or a plurality of numerals such as "123 . . ."). The interdiction may be replaced by the actual set of fields once the user passes interdiction. Such arrangements may provide a high level of accuracy and security, but may use relatively higher computing power.

The financial institution computing system 242 may receive an unmask request to unmask at least a portion of the set of fields on the check image from the user device 110. For example, the check viewing circuit 220 of the user device 110 may receive the unmask request from the user 101 and transmit the unmask request to the interdiction circuit 262. The check image may be displayed on the user device 110 in the banking client application 270 with the set of fields being masked. The banking client application 270 may provide an interactive menu option on the user device 110. In some arrangements, the banking client application 270 may include an "unmask" menu option, which unmasks all the set of masked fields on the check image when engaged by the user 101 after the user 101 passes interdiction. In other arrangements, the user 101 may selectively click on one or more of the set of masked fields (e.g., the account number, the routing number, the check number or the signature) so as to selectively unmask the one or more fields after passing interdiction. In particular arrangements, the financial institution computing system 242 may be configured to enable the user 101 to selectively unmask one or all of the set of masked fields on the check image after passing interdiction regardless of the specific masked field that the user 101 chose to unmask.

The financial institution computing system 242 is configured to determine if the user 101 has passed interdiction. For example, the interdiction circuit 262 may be configured to determine if the user 101 had previously passed interdiction (e.g., had provided an interdiction factor to the financial institution computing system 242). The interdiction factor may include, for example a numeric passcode, a password or a biometric sample. In response to determining that the user 101 has not passed interdiction, the financial institution computing system 242 may be configured transmit an interdiction request to the user device 110 requesting the user 101 to provide the interdiction factor. The interdiction factor may include a stored secret interdiction factor previously agreed upon by the user 101 and the financial institution computing system 242, which may be stored in the account database 250. In other arrangements, the interdiction factor may include a random interdiction factor which may be generated by the financial institution computing system 242 (e.g., the interdiction circuit 262) in response to receiving the unmask request. The random interdiction factor may be stored in the memory 246 of the financial institution computing system 242 (e.g., in the account database 250). The user device 110 may receive the interdiction request from the financial institution computing system 242 factor requesting the user 101 to enter the interdiction factor (e.g., a user prompt via the input/output circuit 205 to the user 101 requesting the user 101 to enter the interdiction factor).

In particular arrangements, the financial institution computing system 242 may be configured to transmit the interdiction factor (e.g., the random interdiction factor) along with the interdiction request to the user device 110. The interdiction request instructs the user 101 to enter the interdiction factor into the user device 110. For example, the interdiction request may include a text message, an email and/or a phone call to the user 101 via the user device 110, and the interdiction factor may include a password transmitted to the user device 110. In other arrangements, the interdiction request may include a text message or an email to the user device 110 instructing the user 101 to call or otherwise contact the financial institution 140 to obtain the interdiction factor. The interdiction request may instruct the user 101 to enter the interdiction factor into the user device 110 (e.g., into a dialogue box displayed thereon).

The financial institution computing system 242 receives the interdiction factor from the user device 110. For example, the interdiction circuit 262 may be configured to receive the interdiction factor via the communication network 120, and compare the interdiction factor to a stored interdiction factor. If the interdiction factor provided by the user 101 matches the stored interdiction factor, the interdiction circuit 262 passes the user 101 from interdiction. In this manner, the financial institution computing system 242 provides an additional level of authentication to ensure that the sensitive fields of the check image are only viewed by an authorized user. In some arrangements in which the interdiction factor was randomly generated and stored in the memory 246 of the financial institution computing system 242, the interdiction factor may be deleted from the memory 246 after the user 101 passes interdiction. In this manner, an interdiction factor may be randomly generated each time the user 101 views check images with interdiction, thereby providing a high level of security.

The financial institution computing system 242 transmits an unmask command to the user device 110. The unmask command is configured to cause the user device 110 (e.g., instructs the check viewing circuit 220) to unmask at least the portion of the set of fields included in the check image, for example, unmask all the set of masked fields or unmask only the set of fields request by the user 101 to be unmasked. The user device 110 receives the unmask command and unmasks at least a portion of the set of masked fields included in the check image.

In particular arrangements, the check image including the masked fields may include a first check image. In such arrangements, the unmask command may be configured to transmit a second check image of the physical check from the financial institution computing system 242 to the user device 110. The set of fields included in the second check image are unmasked. Such arrangements may provide a higher level of security as the check image displayed on the user device 110 before the user 101 passes interdiction includes the masked set of fields which cannot be unmasked, or otherwise data corresponding to the set of fields is not available in the first check image. This reduces the likelihood of an authorized user viewing the set of fields as they are not present in the first check image. The set of fields are only provided on the second check image which is transmitted to and displayed on the user device 110 after the user 101 passes interdiction.

In some arrangements, the unmask command may be configured to allow the user 101 to selectively mask and unmask the set of masked fields included in the check image on the user device 110. For example, after passing interdiction, the user 101 may select a "mask/unmask" menu option provided in the banking client application 270 for selectively masking or unmasking all the set of fields (i.e., all the set of masked fields corresponding to sensitive information) on the check image. In other arrangements, the user 101 may select (e.g., click on or touch on a touch-screen display provided by the input/output circuit 205), a specific field of the set of fields to selectively mask or unmask the specific field after passing interdiction.

In some arrangements, the check image includes a front view and a back view. Only the front view may be accessible on the user device 110 before the user 101 has passed interdiction. The back view may become selectively accessible on the user device 110 after the user 101 passes interdiction. For example, the interdiction circuit 262 may command the check viewing circuit 220 to only display the front view of the check image on the user device 110 before the user 101 passes interdiction. In other arrangements, interdiction circuit 262 may allow the back image to be viewed on the user device 110 before the user 101 passes interdiction, but a set of fields on the back view (e.g., an endorsement line including a signature) may be masked. In still other arrangements, the check image may include the a first check image of the physical check which only includes the front image. The financial institution computing system 242 may be configured to transmit a second check image, including the back view with the set of fields on the back image being unmasked, to the user device 110 after the user 101 passes interdiction. In particular arrangements, the banking client application 270 may provide a "flip image" menu to the user 101. The user device 110 may receive a flip image request from the user 101, for example in response to the user 101 selecting the "flip image" menu on the banking client application 270, and the user device 110 may display the back view of the check image to the user 101 in response to the user 101 having passed interdiction.

In some arrangements, the check image may be a first check image corresponding to a first physical check. The financial institution computing system 242 may receive a second unmask request from the user device 110 to unmask at least a portion of a set of fields included in a second check image which is representative of a second check different from the first check. For example, the user 101 may access a second check image on the user device 110 after viewing the first check image. In response to determining that the user 101 had previously passed interdiction, the financial institution computing system 242 (e.g., the interdiction circuit 262) may be configured to transmit a second unmask command to the user device 110, causing the user device 110 to unmask at least the portion of the set of fields included in the second check image. In this manner, after passing interdiction, the second check image or any other check images are displayed on the user device 110 with the set of fields being masked, and the user 101 may selectively unmask the set of fields without having to provide the interdiction factor again. Such arrangements may provide a high level of security so as to never display a check image automatically without interdiction, unless the user 101 selectively unmasks the set of fields included in the check image.

In some arrangements, in response to passing the user 101 passing interdiction, the financial institution computing system 242 may be configured to generate an authenticated user session associated with user device 110. For example, after passing the user 101 from interdiction, the interdiction circuit 262 may transmit an authenticated user session command to the check viewing circuit 220, causing the check viewing circuit 220 to generate an authenticated user session on the user device 110. The user 101 may access a plurality of check images on the user device 110 during the authenticated user session such that at least a portion of a set of fields included in each of the plurality of check images are masked. The unmask command causes the user device 110 to unmask at least the portion of the set of masked fields included in each of the plurality of check images during the authenticated user session. In other words, the check images are displayed to the user 101 during the authenticated user session with the set of fields included in the check image being unmasked. Such arrangements, may reduce processing system and/or memory usage, for example, by reducing interdiction related communication between the user device 110 and the financial institution computing system 242 once the user 101 passes interdiction. In particular arrangements, the interdiction circuit 262 or the check viewing circuit 220 may allow the user 101 to selectively mask or unmask the set of fields corresponding to the sensitive information during the authenticated user session.

Figure 3:
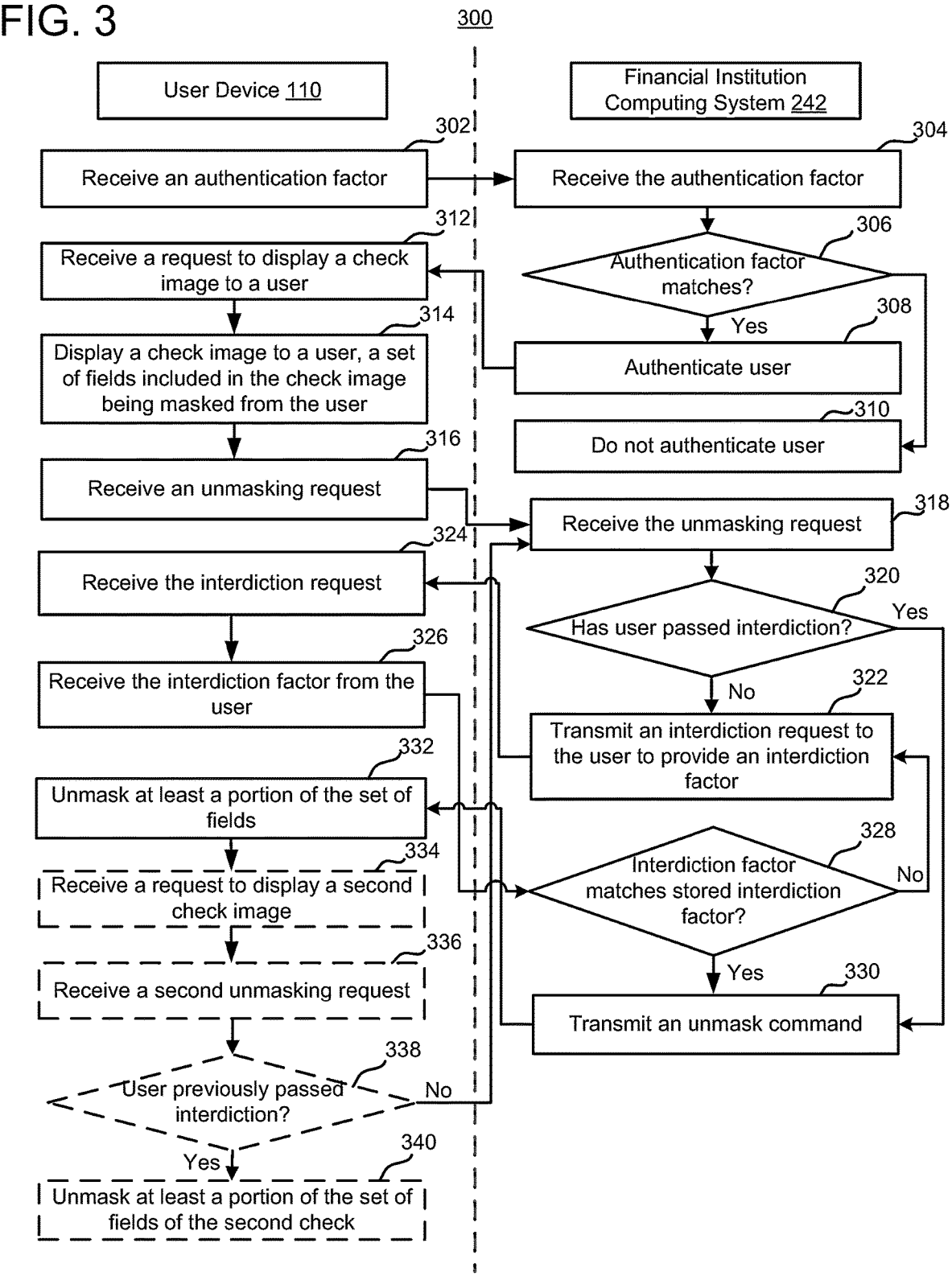
FIG. 3 is a flow diagram illustrating a method for check masking and interdiction by a financial institution computing system, according to some arrangements.

FIG. 3 is a schematic flow diagram of a method 300 for check masking and interdiction, according to various arrangements. While described generally with respect to the financial institution computing system 242 and the user device 110, it should be appreciated that the method 300 may be used with any financial institution computing system or user device. Referring to FIGS. 1-3, the method 300 is generally initiated when the user device 110 receives an authentication factor from the user 101, at 302. For example, the user 101 enters a user a username, a password and/or a biometric sample into the user device 110, for example to access the banking client application 270 and/or the mobile wallet client application 280. Furthermore, the user 101 may intend to view one or more check images on the user device 110. The user device 110 transmits the authentication factor to the financial institution computing system 242.

At 304, the financial institution computing system 242 receives the authentication factor from the user device 110. At 306, the financial institution computing system 242 determines if the authentication factor matches a stored secret knowledge factor, for example a stored password or biometric sample stored in the account database 250. At 310, if the authentication factor does not match the stored secret knowledge factor (306:NO), the financial institution computing system 242 does not authenticate the user 101, and may transmit an authentication request to the user device 110 requesting the user 101 to reenter the authentication factor.

At 308, in response to the authentication factor matching the stored secret knowledge factor (306:YES), the financial institution computing system 242 authenticates the user 101. For example, the user device 110 may receive an authentication command from the financial institution computing system 242 authenticating the user 101. The financial institution computing system 242 may transmit the authentication command to the user device 110 in response to the authentication factor matching a stored secret knowledge factor. The authentication enables the user 101 to view the check image on the user device 110 with the set of fields included in the check image being masked.

At 312, the user device 110 receives a request to display at least one check image corresponding to a physical check on the user device 110. In response to the request, the financial institution computing system 242 may transmit a check image for displaying on the user device 110. The check image is representative of a physical check and a set of fields included in the check image are masked, as previously described herein. At 314, the user device 110 displays the check image to the user 101 with the set of fields (e.g., including a signature, a check number, an account number and/or a check number) being masked.

The set of fields may be masked using any suitable process, as previously described herein. For example, in some arrangements, the financial institution computing system 242 may mask a plurality of predetermined areas on the check image. The plurality of predetermined areas may correspond to a location of the set of fields on the check image. In other arrangements, the financial institution computing system 242 may be configured to identify the set of fields on the check image using at least one of machine vision and text recognition, and mask the identified set of fields, as previous described herein. In some arrangements the masking includes overlaying an image over the set of fields on the check image (e.g., an image, horizontal or vertical bars, redaction, alphabets, numerals, symbols, etc.). In other arrangements, the masking includes displaying a partial view of the check image on the user device 110, for example cropping a bottom portion of the check image (e.g., including the routing number and account number). In still other arrangements, the masking includes removing the set of fields or replacing the set of fields, for example with alphabets, numerals, symbols, etc.

At 316, the user device 110 receives an unmask request to unmask at least a portion of the set of fields included in the check image, and transmit the unmask request to the financial institution computing system 242. At 318, the financial institution computing system 242 receives the unmask request from the user device 110 to unmask at least a portion of the set of fields included in the check image. At 320, the financial institution computing system 242 determines if the user 101 has passed interdiction. In response to the user 101 passing interdiction (320:YES), the method 300 moves to operation 330, and the financial institution computing system 242 transmits an unmask command to the user device 110, as described in further detail below.

In response to determining that the user 101 has not passed interdiction (320:NO), the financial institution computing system 242 transmits an interdiction request to the user device 110 requesting the user 101 to provide an interdiction factor. The user device 110 receives the interdiction request from the financial institution computing system 242. The interdiction factor may include, for example a numeric passcode, a password and/or a biometric sample. In some arrangements, the financial institution computing system 242 may transmit the interdiction factor to the user device 110 along with the interdiction request, and instruct the user 101 to enter the interdiction factor into the user device 110, as previously described herein.

At 326, the user device 110 receives the interdiction factor from the user 101, and transmits the interdiction factor to the financial institution computing system 242. At 328, the financial institution computing system 242 receives the interdiction factor from the user device 110 and determines if the interdiction factor matches a stored interdiction factor. If the interdiction factor does not match the stored interdiction factor (328:NO), the method 300 returns to operation 322, and the financial institution computing system 242 may retransmit the interdiction request to the user device 110.

In response to the interdiction factor matching the stored interdiction factor (328:YES), the financial institution computing system 242 passes the user 101 from interdiction. At 330, the financial institution computing system 242 transmits the unmask command to the user device 110 after the user 101 passes interdiction. The unmask command is configured to cause the user device 110 to unmask the set of masked fields on the check image displayed on the user device 110. At 332, the user device 110 receives the unmask command from the financial institution computing system 242, and unmasks at least a portion of the set of masked fields included in the check image, as previously described herein. In particular arrangements, the check image may include a first check image with the set of fields being masked. In such arrangements, the unmask command may cause the user device 110 to receive a second check image of the physical check from the financial institution computing system 242 such that the set of fields included in the second check image are unmasked. Furthermore, the unmask command may be configured to enable the user 101 to selectively mask and unmask the set of masked fields included in the check image on the user device 110. In particular arrangements, the check image may include a front view and a back view. Only the front view may be accessible on the user device 110 before the user 101 has passed interdiction, and the back view may be selectively accessible on the user device 110 after the user 101 has passed interdiction.

In some arrangements, the user device 110 may receive a request from the user 101 to display a second check image on the user device, at 334. For example, the user 101 may wish to view a second check image representative of a second physical check different from first check, after viewing the first check image. The second check image may be displayed on the user device 110 such that a set of fields (e.g., a signature, routing number, account number and/or check number) included in the check image are masked. At 336, the user device receives a second unmask request from the user 101 requesting the user device 110 to unmask the set of fields included in the second check image. At 338, the user device determines if the user 101 previously passed interdiction. If the user 101 had not previously passed interdiction (338:NO), the method 300 moves to operation 318 and the financial institution computing system 242 receives the unmask command transmitted by the user device 110 to the financial institution computing system 242. In response to the determining that the user 101 had previously passed interdiction (338:YES), the user device 110 unmasks at least the portion of the set of masked fields included in the second check image. For example, the user device 110 may receive a second unmask command from the financial institution computing system 242 to unmask the set of fields included in the second check image.

In particular arrangements, in response to the user 101 having passed interdiction the user device 110 may receive an authenticated user session command from the financial institution computing system 242 which is configured to cause the user device 110 to generate an authenticated user session on the user device 110 associated with the user 101. The authenticated user session may enable the user 101 to access a plurality of check images on the user device 110 during the authenticated user session such that at least a portion of a set of fields included in each of the plurality of check images are masked.

Figure 4:
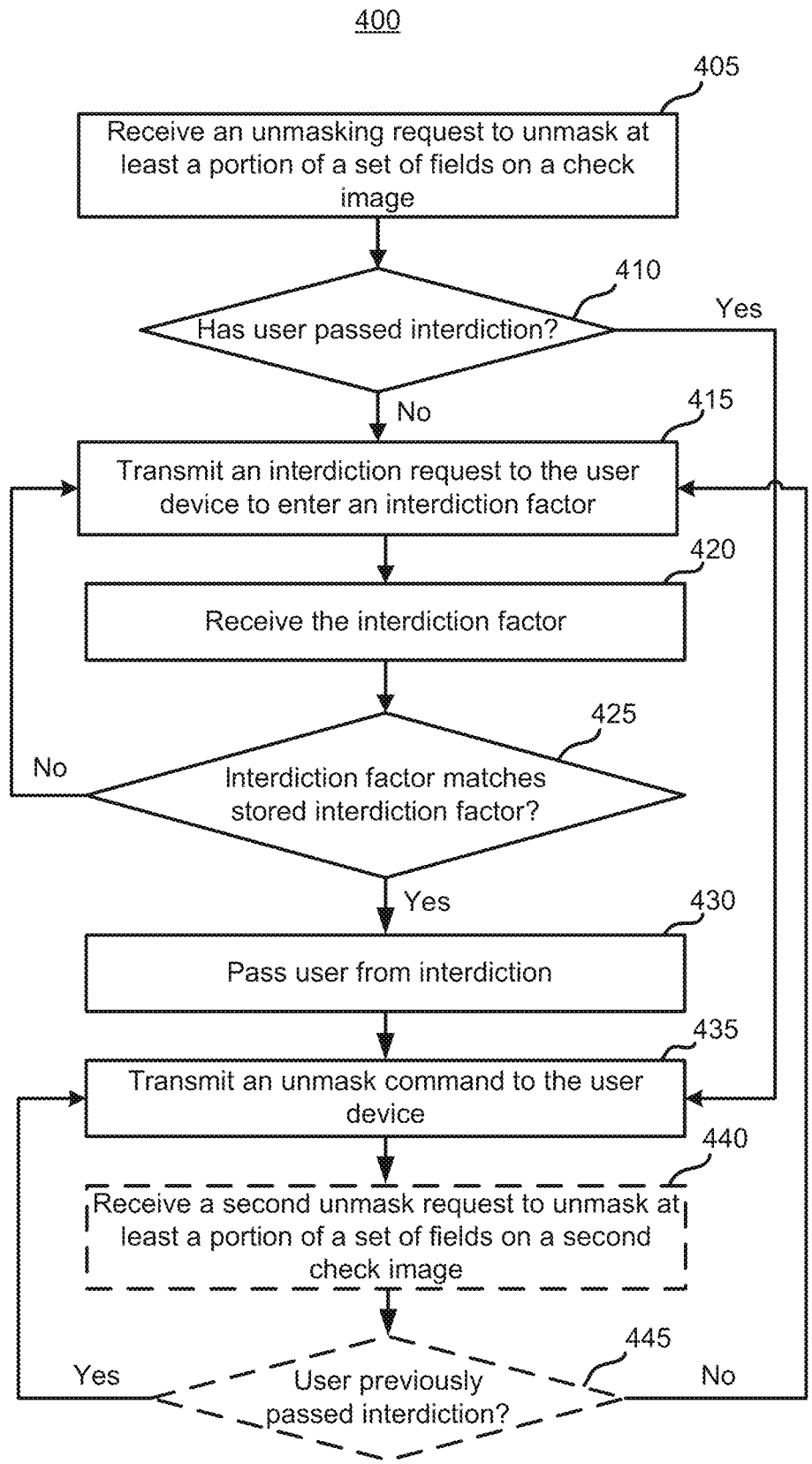
FIG. 4 is a flow diagram illustrating a method of displaying a check image on a user device to an authenticated user with a set of fields on the check image being masked, and selectively unmasking the set of fields after the user passes interdiction, according to some arrangements.

FIG. 4 is a flow diagram illustrating a method 400 for displaying a check image on the user device 110 to an authenticated user 101 with a set of fields on the check image being masked, and selectively unmasking the set of fields after the user 101 passes interdiction, according to some arrangements. While described with respect to the financial institution computing system 242 and the user device 110, the method 400 may be used with any other user device and/or financial institution computing system.

Referring to FIGS. 1-4, the method 400 is generally initiated when the financial institution computing system 242 receives an unmask request to unmask at least a portion of a set of fields included in a check image from a user 101, at 405. For example, the user 101 may be an authenticated user, as previously described herein, and may have requested the user device 110 to display a check image thereon. The check image may be transmitted from the financial institution computing system 242 to the user device 110 such that a set of fields included in the check image are masked, as previously described herein.

At 410, the financial institution computing system 242 determines if the user 101 has passed interdiction. If the user 101 had previously passed interdiction (410:YES), the method 400 proceeds to operation 435, and the financial institution computing system 242 transmits an unmask command to the user device 110, as described in further detail herein. In response to determining that the user 101 has not passed interdiction (410:NO), the financial institution computing system 242 transmits an interdiction request to the user device 110, at 415, requesting the user 101 to enter an interdiction factor into the user device 110. In some arrangements, the financial institution computing system 242 may transmit the interdiction factor to the user device 110 along with the interdiction request, and the interdiction request may instruct the user 101 to enter the interdiction factor into the user device 110.

At 420, the financial institution computing system 242 receives the interdiction factor from the user device 110. The interdiction factor may include a numeric passcode, a password or a biometric sample. At 425, the financial institution computing system 242 determines if the interdiction factor matches a stored interdiction factor. If the interdiction factor received from the user device 110 does not match the stored interdiction factor (425:NO), the method 400 returns to operation 415, and the financial institution computing system 242 may retransmit the interdiction request to the user device 110. In response to the interdiction factor matching the stored interdiction factor (425:YES), the financial institution computing system 242 passes the user 101 from interdiction, at 430. At 435, the financial institution computing system 242 transmits the unmask command to the user device 110. The unmask command causes the user device 110 to unmask at least a portion of the set of masked fields included in the check image displayed on the user device 110.

In some arrangements, at 440, the financial institution computing system 242 may receive a second unmask request from the user device 110 requesting the financial institution computing system 242 to unmask at least a portion of a set of fields included in a second check image. For example, the user 101 may access a second check image on the user device 110, and the financial institution computing system 242 may transmit the second check image to the user device 110 with the set of fields (e.g., a signature, an account number, a checking number or a check number) included in the second check image being masked. At 445, the financial institution computing system 242 may be configured to determine if the user 101 previously passed interdiction. If the financial institution computing system 242 determines that the user 101 did not previously pass interdiction (445:NO), the method 400 returns to operation 415, and the financial institution computing system 242 may transmit an interdiction request to the user device 110.

In response to determining that the user previously passed interdiction (445:YES), the method 400 proceeds to operation 435 and the financial institution computing system 242 transmits a second unmask request to the user device 110 causing the user device 110 to unmask the set of fields included in the second check image. In some arrangements, the financial institution computing system 242 may generate an authenticated user session associated with the user 101 after the user 101 passes interdiction. The authenticated user session may enable the user 101 to view a plurality of check images on the user device 110 with the set of fields included in each of the check image being unmasked. Furthermore, the unmask command may enable the user 101 to selectively mask or unmask the set of fields included in each of the plurality of check images.

Figure 5:
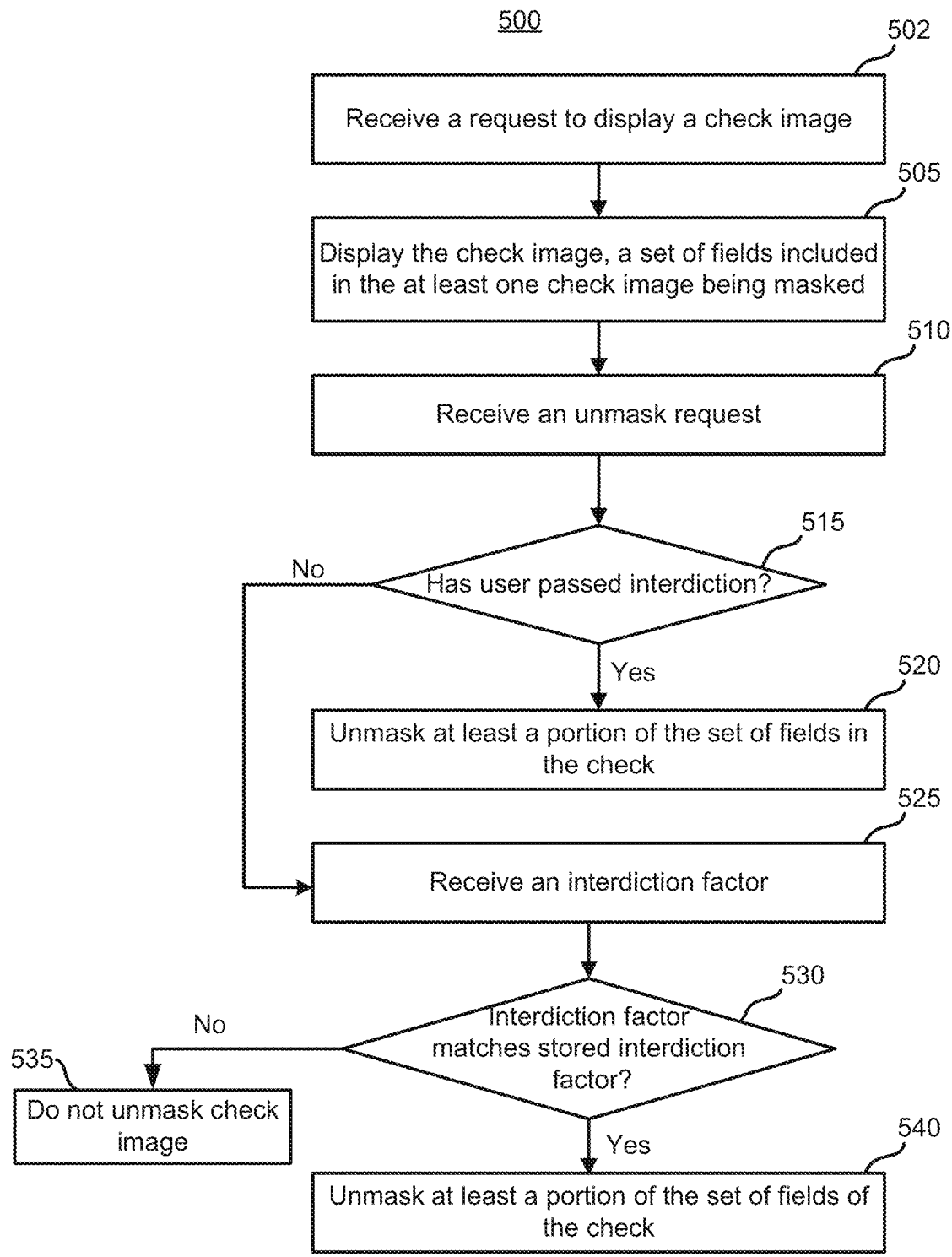
FIG. 5 is a flow diagram illustrating a method for check masking and interdiction, according to some arrangements.

FIG. 5 is a flow diagram illustrating a method 500 for check masking and interdiction, according to some arrangements. Referring to FIGS. 1-5 each of 502-535 correspond to one or more of operations 304-340 of FIG. 3 and operations 405-445 of FIG. 4. The method 500 may be implemented with the financial institution computing system 242 or any other suitable financial institution computing system described herein. The method 500 includes receiving a request to display a check image to a user, at 502. For example, the user device 110 may receive a request from the user 101 to display a check image thereon. The check image is representative of a physical check.

At 505, the check image is displayed to the user such that a set of fields (e.g., a signature, an account number, a routing number or a check number) included in the check image are masked. For example, the financial institution computing system 242 transmits the check image for displaying on the user device 110 such that the set of fields included in the check image are masked, as previously described herein. At 510, an unmask request is received. For example, the financial institution computing system 242 may receive an unmask request from the user 101. At 515, it is determined if the user has passed interdiction. For example, the financial institution computing system 242 may determine if the user 101 has passed interdiction in response to receiving the unmask request from the user device 110.

If the user has passed interdiction (515:YES), at least a portion of the set of fields included in the check image are unmasked, at 520. For example, the financial institution computing system 242 may unmask the set of fields included in the check image, as previously described herein, in response to the user passing interdiction. In response to determining that the user has not passed interdiction (515: NO), the method 500 proceeds to operation 525, and an interdiction factor is received from the user. For example, the financial institution computing system 242 may transmit an interdiction request to the user device 110 (e.g., an interdiction request including the interdiction factor as previously described herein), requesting the user 101 to provide the interdiction factor. The user 101 may then enter the interdiction factor into the user device 110, and the user device 110 may transmit the interdiction factor to the financial institution computing system 242.

At 530, it is determined if the interdiction factor matches a stored interdiction factor. For example, the financial institution computing system 242 may be configured to match the interdiction factor received from the user device 110 with the stored interdiction factor. If the interdiction factor does not match the stored interdiction factor (530:NO), the method proceeds to operation 535, and the set of fields remain masked (i.e., the set of fields are not unmasked). In response to determining that the interdiction factor matches the stored interdiction factor (530:YES), at least a portion of the set of fields are unmasked, at 540. For example, on determining that the interdiction factor provided by the user 101 matches the stored interdiction factor, the financial institution computing system 242 may transmit an unmask command to the user device 110 which causes the user device 110 to unmask the set of masked fields included in the check image.

It should be appreciated that the systems (e.g., the system 100) and methods (e.g., the methods 300, 400, 500) described herein solve the problem of identity theft and fraud specifically arising in graphical user interfaces (e.g., the input/output circuit 205 of the user device 110), when check images are displayed thereon, and include operations that cannot be performed abstractly in the human mind or by a human using pen or paper. Conventional methods for interdicting sensitive information on checks or other documents (e.g., credit card receipts, bank deposit receipts, bank statements etc.) generally involve replacing at least a portion of the sensitive information (e.g., credit card number, bank account number, routing number, check number, etc.) with a string of alphabets or numerals (e.g., a string of "X's" replacing the initial digits of an account number so that only the last four digits of the account number are displayed). However, this method is prone to hacking as the replaced numbers or letters are generally still available on a device associated with the graphical user interface, and the process can be reversed to display the original numbers or letters so as to reveal the full field. For example, conventional interdiction methods are generally performed on text-based files, e.g., standard webpage or documents including plain text. In contrast, the systems and methods for check masking and unmasking described herein are configured to perform interdiction on digital images, i.e., the check image which is representative of a physical check, by overlaying the set of fields including sensitive information with masking thereon, replacing all the alphanumeric information thereon, and/or displaying a first check image on the user device with the set of fields erase, and generating a new check image with the set of fields included therein once the user passes interdiction, as previously described herein.

Furthermore, non-alphanumeric information, for example, signatures on a check cannot be interdicted by conventional interdiction methods. For example, conventional interdiction methods use optical character recognition (OCR) to identify the set of fields for interdiction. However, OCR only identifies alphanumeric information and does not have the capability of identifying non-alphanumeric information, such as signatures included in a check image. In contrast, systems and methods described herein, interdict a set of fields, which may include an authorized signature, included in a digital image by masking the set of fields, for example, by calculating the proportional size and position of the masking on the check image based on a predetermined template, or identifying the set of fields and their placement on the check image via machine vision or and/or text recognition. In this manner, systems and methods described herein provide a higher level of security then conventional methods.

Moreover, systems (e.g., the system 100) and methods (e.g., the methods 300, 400, 500) described herein also allow for unmasking of the masked set of fields after the user passes interdiction. Conventional methods for interdicting sensitive information generally do not provide the option to a user for viewing the replaced set of fields. However, in various instances, an authorized user may have to view the set of interdicted fields (e.g., signature, check number, account number, routing number, etc.). By allowing unmasking of the masked set of fields after the user passes interdiction, the systems and methods described herein provide an additional level of security so as to prevent identity theft and fraud by initially masking the set of fields, while providing the convenience of selectively viewing the masked set of fields to the user after the user passes interdiction.

Figure 6:
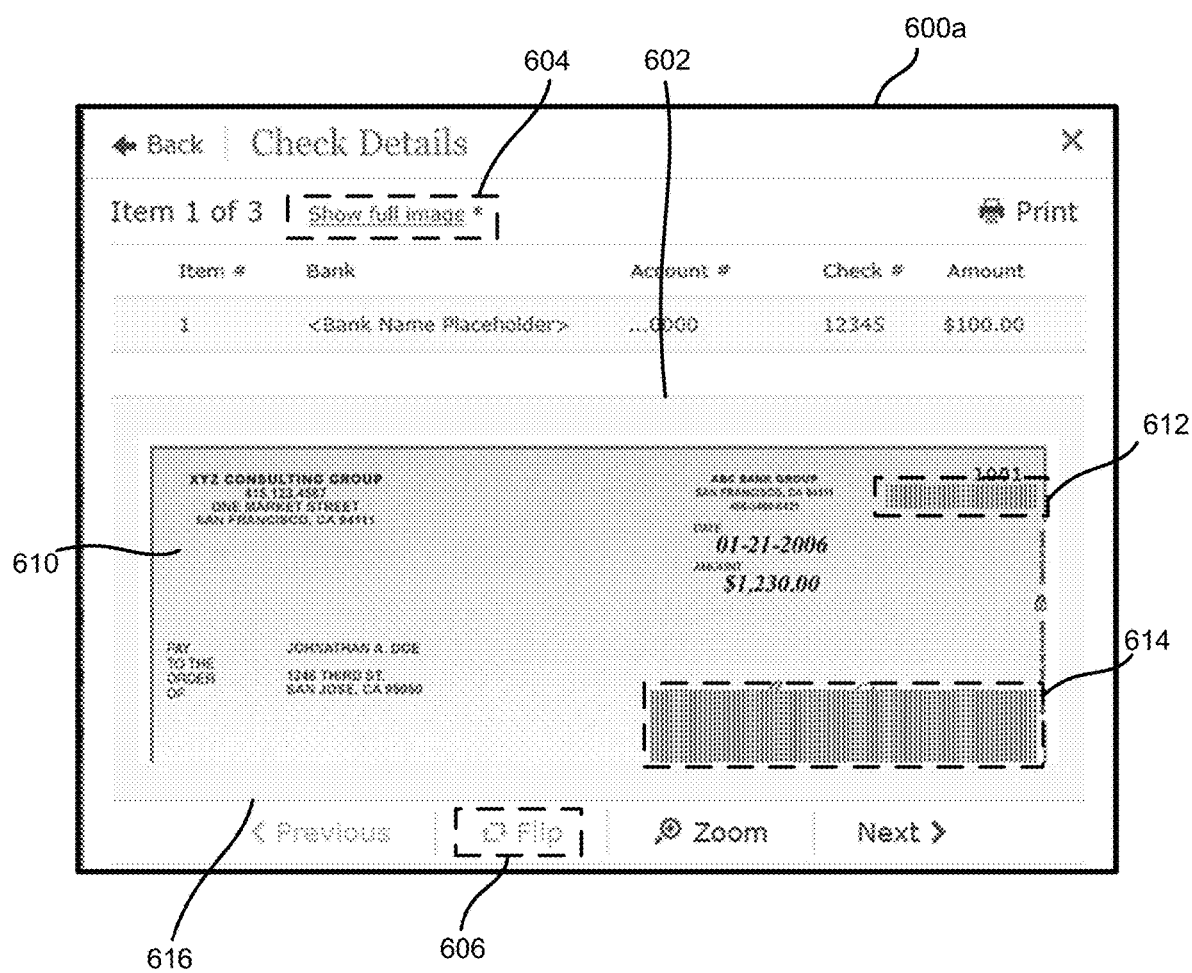
FIG. 6 is an interface display diagram illustrating an interactive interface displaying a check image of an example check such that a set of fields included in the check image are masked, according to some arrangements.
Figure 7:
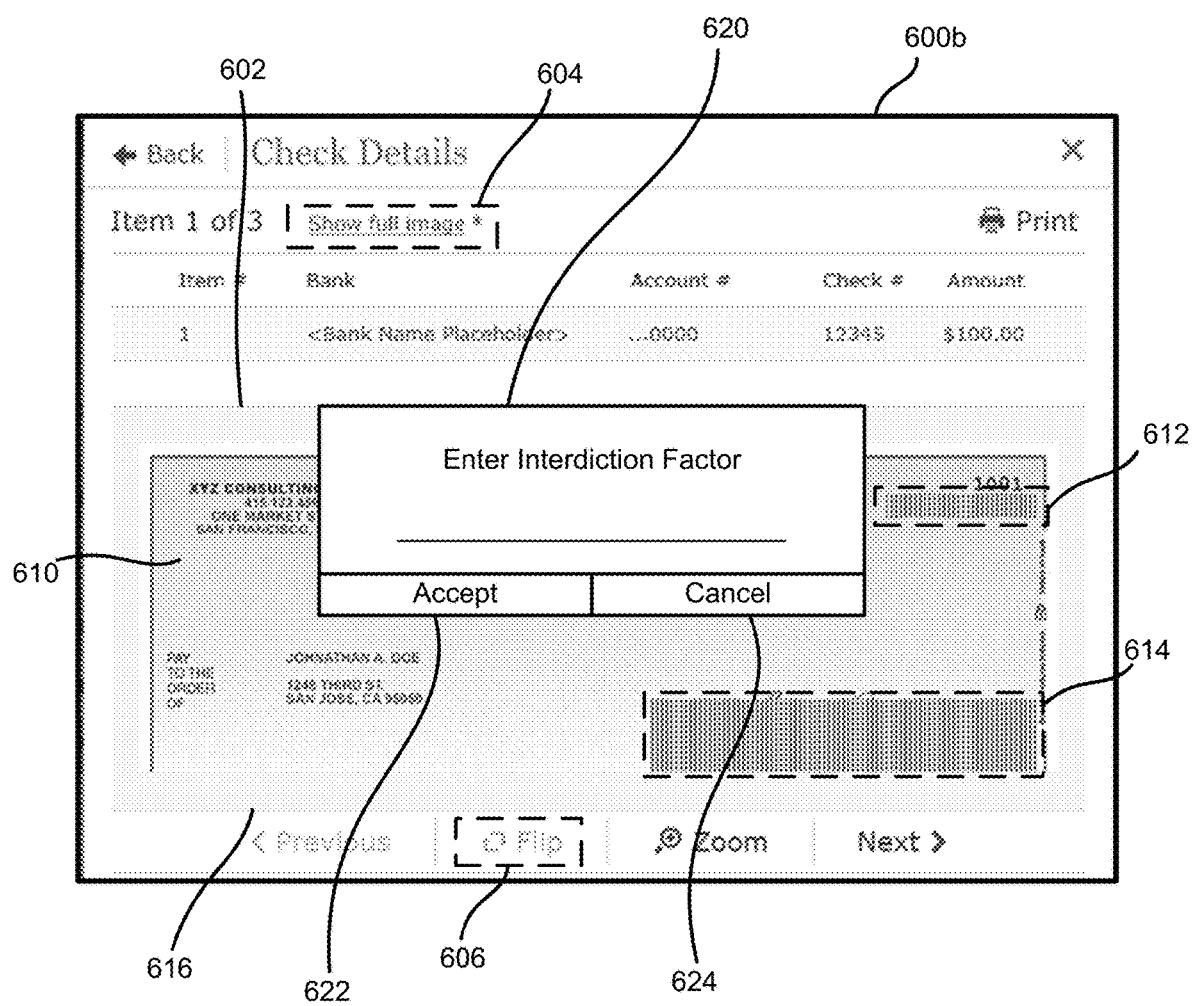
FIG. 7 is an interface display diagram illustrating an interactive interface displaying the check image of FIG. 6 on the user device, and an interdiction message requesting the user to enter an interdiction factor, according to some arrangements.
Figure 8:
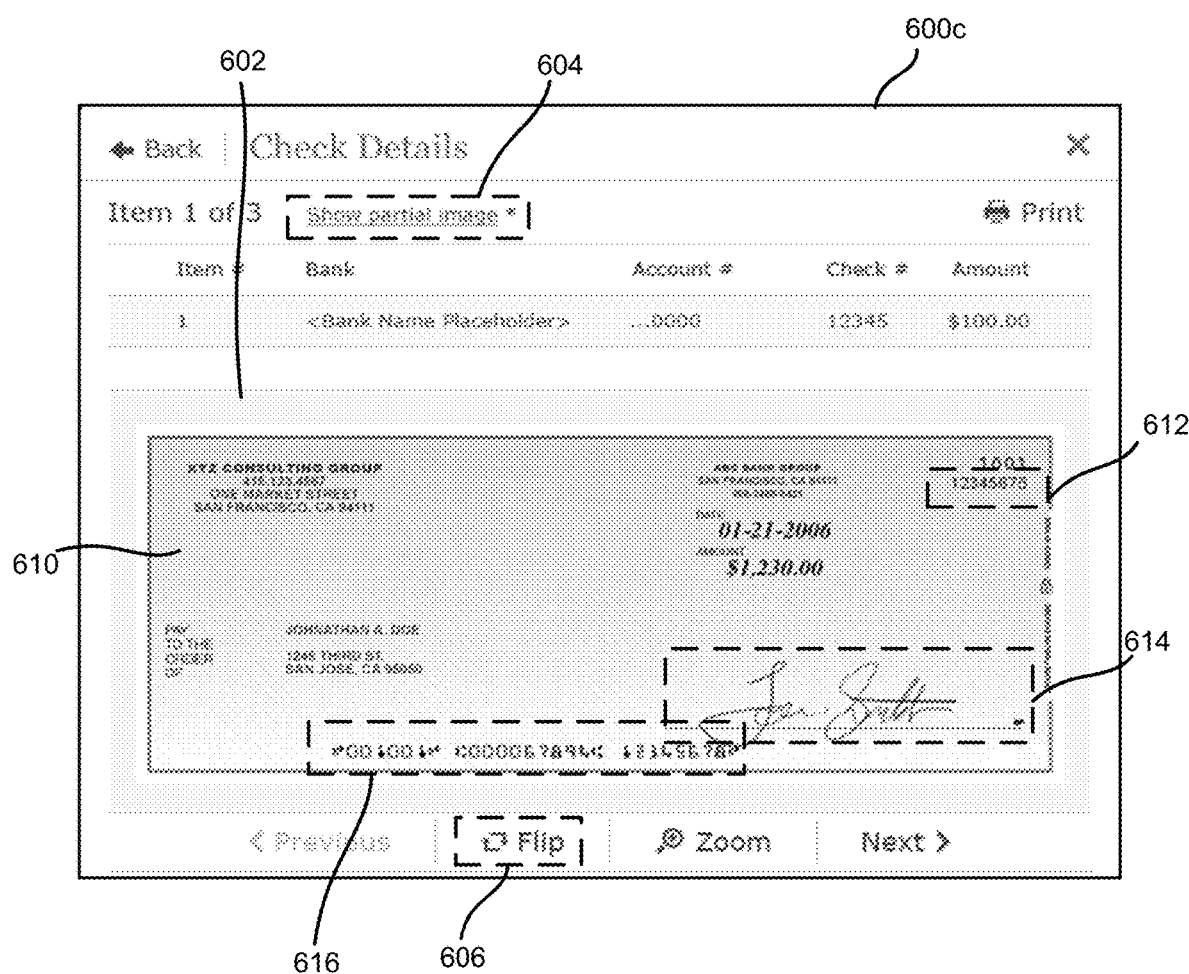
FIG. 8 is an interface display diagram illustrating an interactive interface displaying the check image of FIG. 6 with the set of fields unmasked in response to the user passing interdiction.

FIG. 6-8 show various interactive interfaces which may be provided on the user device 110 for viewing the check images thereon, according to various arrangements. Referring to FIGS. 1-8, the interactive interfaces of FIGS. 6-8 may be used with method 300, 400, 500 or any other method described herein, and may be available on the user device 110 or any other user device described herein.

FIG. 6 shows an example interactive interface 600*a* which may be displayed on the user device 110 for viewing one or more check images. The interactive interface 600*a* includes a first window 602 within which an example check image 610 is displayed. The check image 610 corresponds to a physical check, and is representative thereof. Furthermore, the check image 610 may include a front view of the corresponding physical check. The check image 610 is displayed in the first window 602 with interdiction. Expanding further, a first field 612, a second field 614 and a third field 616 included in the check image 610 are masked. The first field 612 and the second field 614 are masked by overlaying a plurality of vertical lines thereon, and the third field 616 is masked by cropping a bottom portion of the check image 610. The first field 612 may include a check number, the second field 614 may include a signature, and the third field 616 may include an account number and a routing number. The interactive interface 600*a* also includes a first menu option 604 and a second menu option 606 among various others. As shown in FIG. 6, the first menu option 604 may be an interactive option stating "show full image," configured to be selectively engaged by the user 101 for removing the masking from the set of fields 612, 614 and 616, after the user 101 passes interdiction. Furthermore, the second menu option 606 may also include an interactive option stating "flip," configured to be selectively engaged by the user 101 for viewing a back view of the check image 610 after the user 101 passes interdiction. The second menu option 606 may not be available to the user 101 before passing interdiction (e.g., may be displayed but is not selectable by the user 101). In other arrangements, the second menu option 606 may be available to the user 101 before interdiction but selecting the second menu option 606 may lead to a request to the user 101 to enter the interdiction factor.

FIG. 7 shows another example interactive interface 600b which is similar to the interactive interface 600a, and also includes a second window 620 requesting the user 101 to enter an interdiction factor. For example, the user 101 may engage (e.g., click on or touch on a touch screen) the first menu option 604 or the second menu option 606 causing the second window to display (e.g., pop-up) on the user device 110. In some arrangements, the interdiction factor may be provided to the user 101. For example, the interdiction factor may include a numeric passcode or alpha numeric password which is communicated to the user 101 via a text message, an email and/or a phone call. In some arrangements, the user 101 may be instructed to call the financial institution 140 to receive the interdiction factor. The second window 620 may provide a blank field for receiving the interdiction factor from the user 101. The user 101 may select a first element 622 ("Accept") included in the second window 620 to enable the user device 110 to receive the interdiction factor and/or transfer the interdiction factor to a financial institution computing system 242 to verify the interdiction factor. The user 101 may select a second element 624 ("Cancel") included in the second window 620 if the user 101 does not want to move forward with interdiction. While FIG. 7 shows a second window 620 as a pop-up window, in other arrangements, the user may be redirected to an interdiction factor landing page on selecting the first menu option 604 and/or the second menu option 606. The elements of the second window 620 may be displayed on the interdiction factor landing page so that the user may enter the interdiction factor thereat. In response to the correct interdiction factor being entered, the user may be returned to the first window 602 showing the check image 610 with the interdiction removed.

FIG. 8 shows an example interactive interface 600c which is similar to the interactive interface 600a and may be displayed on the user device 110 after the user 101 passes interdiction. The check image 610 is displayed in the first window 602 of the interactive interface 600c with the set of fields 612, 614 and 616 being unmasked, i.e., the vertical bars over laid on the first field 612 and the second field 614 removed, and the bottom portion of the check image 610 uncropped so as to display the third field 616. The second menu option 606 may now become available to the user 101, and may be selectively engaged by the user 101 to view the back view of the check. Furthermore, the first menu option 604 may be selectively engaged by the user 101 to again mask the set of fields (e.g., state "show partial image") if the user 101 chooses to do so.

It should be noted that the term "example" as used herein to describe various embodiments or arrangements is intended to indicate that such embodiments or arrangements are possible examples, representations, and/or illustrations of possible embodiments or arrangements (and such term is not intended to connote that such embodiments or arrangements are necessarily crucial, extraordinary, or superlative examples).

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick, touch sensitive screen or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and While this specification contains many specific implementation details, these should not be construed as limitations on the scope of any arrangement or of what may be claimed, but rather as descriptions of features specific to particular implementations of particular arrangements. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method, comprising:
receiving, by a computing system, a request to display a first digital image on a user device associated with a user, the first digital image representative of a first side of a physical check, the physical check having sensitive information in a field;
deleting, by the computing system, the sensitive information from the first digital image so the sensitive information is unrecoverable and unretrievable from the first digital image;
after deleting the sensitive information from the first digital image, displaying, by the computing system, the first digital image on the user device;
receiving, by the computing system from the user device, an unmask request;
determining, by the computing system, the user has failed to pass interdiction;
in response to determining that the user has failed to pass interdiction, transmitting, by the computing system, an interdiction factor to the user device, the interdiction factor comprising a biometric sample;
receiving, by the computing system from the user device, the interdiction factor;
matching, by the computing system, the interdiction factor to a stored interdiction factor;
in response to the interdiction factor matching the stored interdiction factor, passing, by the computing system, the user from interdiction;
after passing the user from interdiction, displaying, by the computing system, a second digital image on the user device, the second digital image comprising the sensitive information in the field, the field being masked; and
in response to receiving the unmask request, unmasking, by the computing system, the field included in the second digital image.

2. The method of claim 1, further comprising:
displaying a first clickable hyperlink on the user device when the first digital image is displayed on the user device, the first clickable hyperlink configured to be selectively engaged by the user to send the unmask request.

3. The method of claim 2, further comprising:
in response to detecting engagement of the first clickable hyperlink, displaying a window on the user device, the window providing a blank field for receiving the interdiction factor from the user.

4. The method of claim 2, further comprising:
displaying a second clickable hyperlink on the user device when the first digital image is displayed on the user device, the second clickable hyperlink disabled if the user has failed to pass interdiction; and
enabling the second clickable hyperlink in response to the user passing interdiction.

5. The method of claim 4, further comprising
in response to detecting engagement of the second clickable hyperlink, displaying a third digital image on the user device, the third digital image being of a second side of the physical check.

6. The method of claim 1, further comprising displaying a clickable image over the field of the first digital image, the clickable image configured to be selectively engaged by the user to send the unmask request.

7. The method of claim 1, further comprising;
- identifying the sensitive information on the first digital image using at least one of machine vision and text recognition.

\* \* \* \* \*